(12) United States Patent
Kamata

(10) Patent No.: US 7,529,843 B2
(45) Date of Patent: May 5, 2009

(54) INFORMATION PROCESSING SYSTEM, INFORMATION PROCESSING APPARATUS, INFORMATION PROCESSING METHOD, STORAGE MEDIUM THAT STORES PROGRAM FOR IMPLEMENTING THAT METHOD TO BE READABLE BY INFORMATION PROCESSING APPARATUS, AND PROGRAM

(75) Inventor: Tamaki Kamata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 10/401,839

(22) Filed: Mar. 31, 2003

(65) Prior Publication Data

US 2003/0187961 A1    Oct. 2, 2003

(30) Foreign Application Priority Data

Apr. 1, 2002    (JP) .............................. 2002-099346

(51) Int. Cl.
*G06F 15/16* (2006.01)

(52) U.S. Cl. ...................... 709/229; 709/200; 709/224; 719/311; 726/27

(58) Field of Classification Search ................. 709/224, 709/229, 225, 250; 719/311; 726/27
See application file for complete search history.

(56) References Cited

U.S. PATENT DOCUMENTS

| | | | |
|---|---|---|---|
| 5,606,574 A * | 2/1997 | Hasegawa et al. | 375/130 |
| 5,610,688 A | 3/1997 | Inamoto et al. | 399/366 |
| 6,163,383 A * | 12/2000 | Ota et al. | 358/1.1 |
| 6,647,389 B1 * | 11/2003 | Fitch et al. | 707/10 |
| 6,678,068 B1 * | 1/2004 | Richter et al. | 358/1.15 |
| 6,763,396 B2 * | 7/2004 | Torikai | 709/250 |
| 6,879,978 B2 * | 4/2005 | Yoshiura et al. | 707/3 |
| 7,106,465 B1 * | 9/2006 | Simpson et al. | 358/1.15 |
| 7,130,886 B2 * | 10/2006 | Little et al. | 709/206 |
| 7,304,753 B1 * | 12/2007 | Richter et al. | 358/1.15 |
| 2002/0075508 A1 * | 6/2002 | Luman | 358/1.15 |
| 2002/0103645 A1 * | 8/2002 | Uemura et al. | 704/246 |
| 2003/0078798 A1 * | 4/2003 | Zaks et al. | 705/1 |
| 2004/0190699 A1 * | 9/2004 | Doherty et al. | 379/201.12 |

FOREIGN PATENT DOCUMENTS

| | | |
|---|---|---|
| JP | 6-214903 | 8/1994 |
| JP | 2000-33752 | 2/2000 |

* cited by examiner

*Primary Examiner*—Salad Abdullahi
*Assistant Examiner*—El Hadji M Sall
(74) *Attorney, Agent, or Firm*—Fitzpatrick, Cella, Harper & Scinto

(57) ABSTRACT

An information processing system comprises a first information processing apparatus and a second information processing apparatus. The first information processing apparatus comprises transmission means for transmitting data to said second information processing apparatus and registration means for instructing said second information processing apparatus to execute registration of the data. On the other hand, the second information processing apparatus comprises verification means for verifying data received from said first information processing apparatus, acquisition means for acquiring status of a verification process by said verification means and control means for controlling to output a verification result by a method, which varies depending on the status of the verification process, when the registration instruction is received. The information processing system according to the present invention can notify the user of the verification result of data by a server using an appropriate method.

6 Claims, 10 Drawing Sheets

FIG. 7

| JOB ID 701 | FILE NAME 702 | VERIFICATION START DATE AND TIME 703 | VERIFICATION STATE 704 | VERIFICATION RESULT 705 |
|---|---|---|---|---|
| 1001 | FILE1.PDF | 200112181500 | VERIFICATION END | VERIFICATION SUCCESSFUL |
| 1002 | FILE2.PDF | 200112181600 | VERIFICATION IN PROGRESS | — |
| 1003 | FILE3.PDF | 200112191600 | VERIFICATION ERROR | VERIFICATION FAILURE |

INFORMATION PROCESSING SYSTEM, INFORMATION PROCESSING APPARATUS, INFORMATION PROCESSING METHOD, STORAGE MEDIUM THAT STORES PROGRAM FOR IMPLEMENTING THAT METHOD TO BE READABLE BY INFORMATION PROCESSING APPARATUS, AND PROGRAM

FIELD OF THE INVENTION

The present invention relates to an information processing system, information processing apparatus, and information processing method, which verify if data transferred via a network can be normally processed, and notify the user of the verification result, a storage medium that stores a program for implementing that method to be readable by an information processing apparatus, and that program.

BACKGROUND OF THE INVENTION

In a conventional system, a server on the network executes various processes such as a print process and the like for data transferred from the user. The server verifies if it can execute a required process for data, and notifies the user of that verification result. However, the user is notified of the verification result, and usability is low.

SUMMARY OF THE INVENTION

The present invention has been made in consideration of the conventional problems, and has as its object to provide an information processing system, information processing apparatus, and information processing method, which notify the user of the verification result of data by a server using an appropriate method, a storage medium that stores a program for implementing that method to be readable by an information processing apparatus, and that program.

In order to achieve the above objects, the present invention provides an information processing apparatus comprising: reception means for receiving data; verification means for verifying the data; acquisition means for acquiring status of a verification process; and control means for controlling to output a verification result by -a method, which varies depending on the status of the verification process.

The apparatus further comprises means for receiving a verification instruction indicating whether or not the data is to be verified, and the verification means executes the verification process in accordance with the verification instruction. The apparatus further comprises registration means for executing a process of registering the data, and the verification process, and the registration process are executed in parallel. The method is one of a method of outputting Web page information via the Internet and a method of outputting an e-mail message. The control means controls to output the verification result as an e-mail message when the status of the verification process indicates that verification is in progress, and to output Web page information containing the verification result when the status of the verification process indicates that verification is complete. The verification means verifies whether or not the data is suited to a print process.

The present invention also provides an information processing method comprising the steps of: receiving data; verifying the data; acquiring status of the verification process; and controlling to output a verification result by a method, which varies depending on the status of the verification process.

The present invention also provides a program for making a computer execute an information processing method, the method comprising the steps of: receiving data; verifying the data; acquiring status of the verification process; and controlling to output a verification result by a method, which varies depending on the status of the verification process.

The present invention further provides a storage medium computer-readably storing a program for making a computer execute an information processing method, the method comprising the steps of: receiving data; verifying the data; acquiring status of the verification process; and controlling to output a verification result by a method, which varies depending on the status of the verification process.

The present invention further more provides an information processing system comprising: a first information processing apparatus; and a second information processing apparatus. The first information processing apparatus comprises: transmission means for transmitting data to the second information processing apparatus; and registration means for instructing the second information processing apparatus to execute registration of the data. The second information processing apparatus comprises: verification means for verifying data-received from the first information processing apparatus; acquisition means for acquiring status of a verification process; and control means for controlling to output a verification result by a method, which varies depending on the status of the verification process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a table showing an example of a verification result data item list held in a verification result storage unit by the center server;

DETAILED DESCRIPTION OF THE PREFERRED EMBODIMENTS

A preferred embodiment of the present invention will be described in detail hereinafter with reference to the accompanying drawings.

In this embodiment, an information processing system which provides a print process service of data that is transferred from a user system via a network such as the Internet or the like will be exemplified.

The information processing system comprises user systems that issue print process service requests, a center server that manages received and placed orders of print services, and print shops that provide print process services. However, the present invention is not limited to such specific embodiment, and can be applied to information processing systems which provide other services. Such systems are also included in the present invention. Other services include a service for storing audio data and image data in media, a service for reproducing such data, and the like.

Example of Arrangement of Information Processing System of This Embodiment

Figure 1:
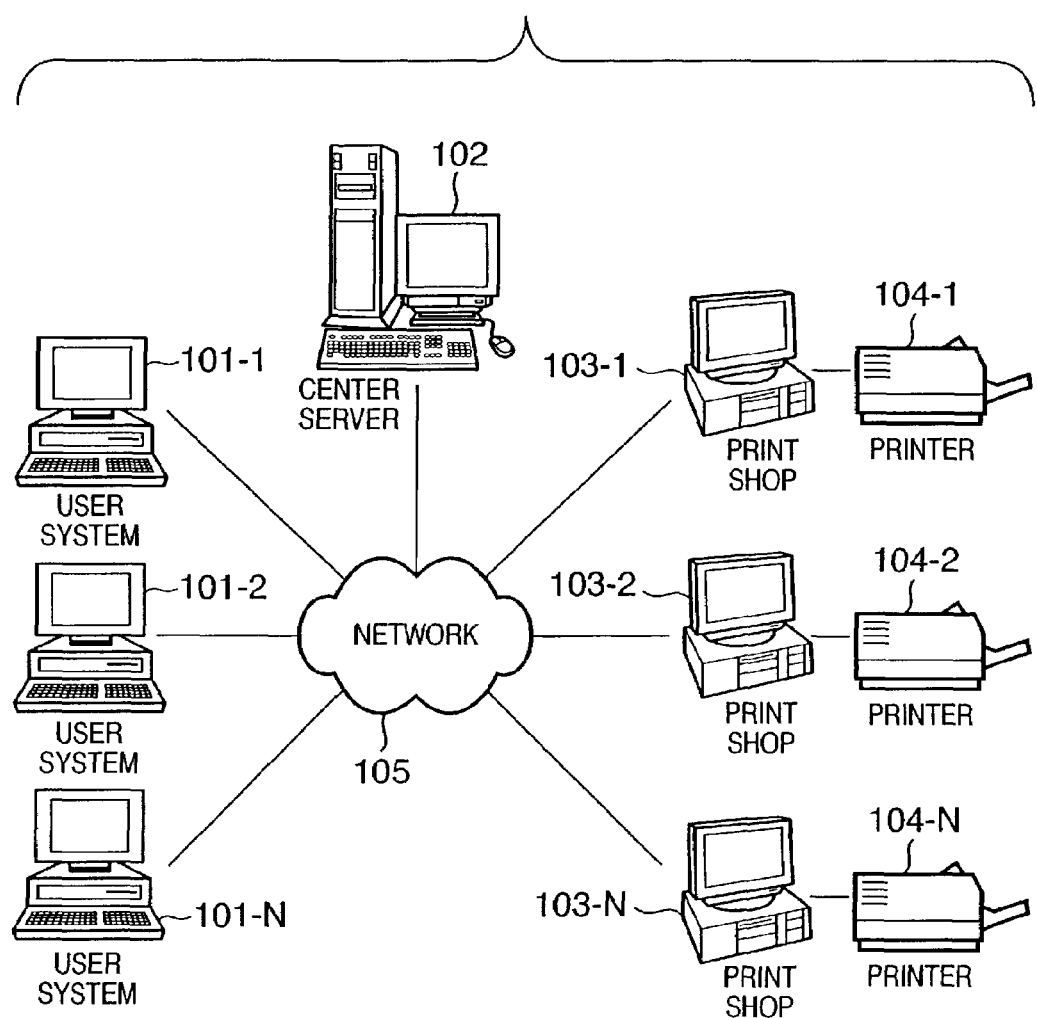
FIG. 1 is a diagram showing an example of the network arrangement of the overall print service system according to an embodiment of the present invention.

FIG. 1 shows an information processing system in which user systems 101(1), 101(2), ..., 101(N), a center server 102, and print shops 103(1), 103(2), ..., 103(N) are connected via a network 105 such as the Internet or the like.

Between each user system 101 and the center server 102 or between the center server 102 and each print shop 103, various data are exchanged by an always-on connection via the network 105 or a periodical dial-up connection from the user system 101 or print shop 103 side.

Printeres 104(1), 104(2), ..., 104(N) are respectively connected to the print shops 103(1), 103(2), ..., 103(N) via a Local Area Network (LAN) or Universal Serial Bus (USB) cable, or the network 105 such as the Internet or the like.

As will be described in detail later, the user system 101 is an information processing apparatus (computer system) which includes a Central Processing Unit (CPU), Read Only Memory (ROM), Random Access Memory (RAM), Hard Disk Drive (HDD), and the like, and executes an application used to create, edit, and select image data and to transmit image data to the center server 102 in accordance with user's operations.

The center server 102 is an information processing apparatus (computer system) which includes a CPU, ROM, RAM, HDD, and the like, and does not normally require any full-time operator in an image data verification process of this embodiment.

The print shop 103 is an information processing apparatus (computer system) which includes a CPU, ROM, RAM, HDD, and the like, and is operated by a full-time operator who receives a print request of image data from the user system 101 via the center server 102, and prints the image data using the printeres 104.

Note that the user systems 101(1), 101(2), ..., 101(N) have the same arrangement, and a specific one of the plurality of user systems 101(1), 101(2), ..., 101(N) is expressed as a user system 101(X) for the sake of simplicity. Also, the whole of the plurality of user systems 101(1), 101(2), ..., 101(N) is simply expressed as a user system 101. The same applies to the print shops and printeres.

Figure 2:
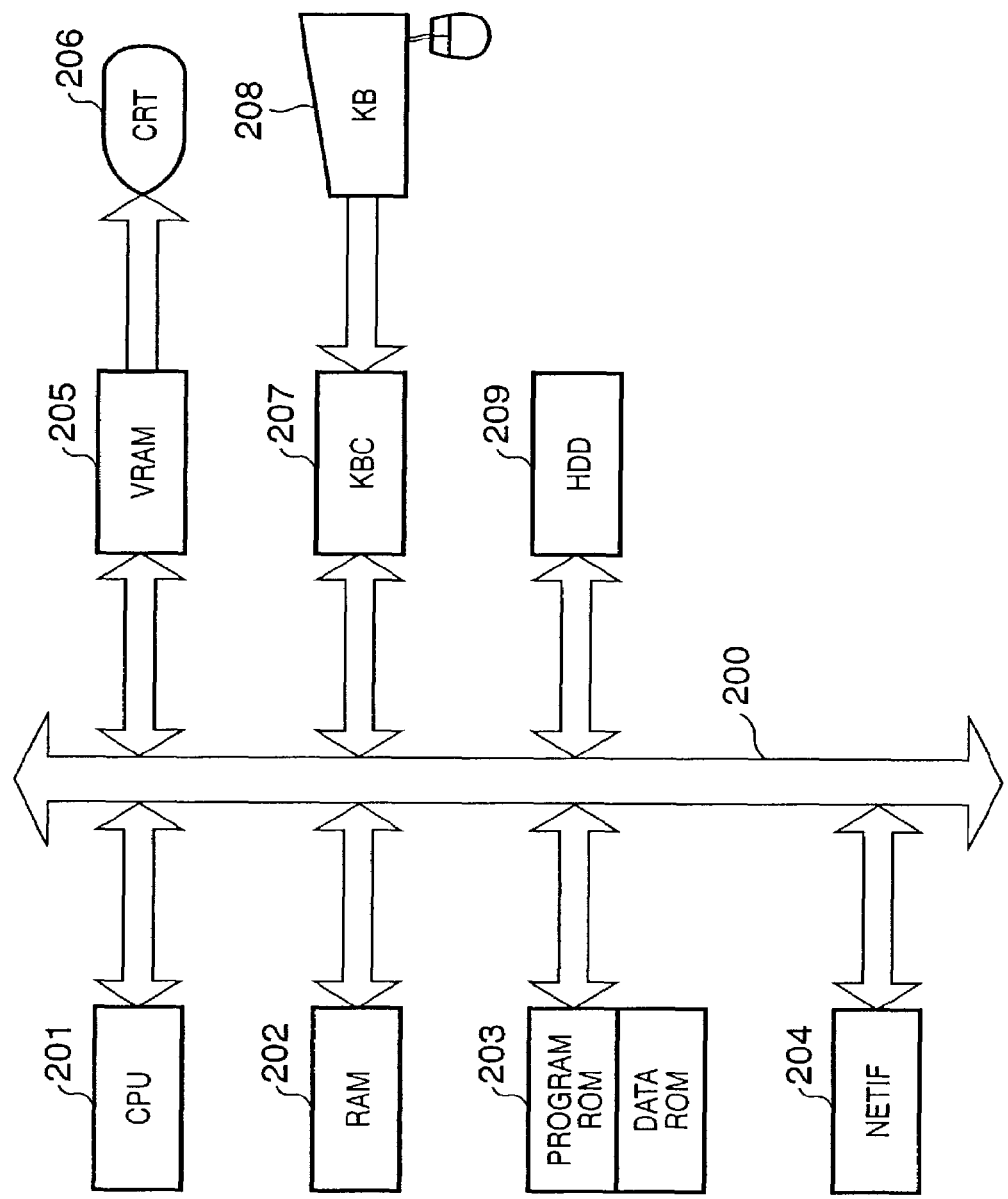
FIG. 2 is a block diagram showing an example of the hardware arrangement of a user system, center server, or print shop, which forms the print service system of this embodiment.

Example of Hardware Arrangement of Information Processing Apparatus of This Embodiment FIG. 2 is a block diagram showing an example of the hardware arrangement of an information processing apparatus of this embodiment. A common internal arrangement required in the information processing apparatuses of the user system 101, center server 102, and print shop 103 will be explained first with reference to FIG. 2. Note that differences among the internal arrangements of the information processing apparatuses of the user system 101, center server 102, and print shop 103 will be described later.

The hardware arrangement of the information processing apparatus of the user system 101, center server 102, or print shop 103 will be described first using FIG. 2.

Referring to FIG. 2, reference numeral 201 denotes a central processing unit (CPU) which controls arithmetic and control processes of the information processing apparatuses 101 to 103. Reference numeral 202 denotes a RAM which serves as a main memory of the CPU 201, an area for an execution program, an execution area of the program, and a data area. Reference numeral 203 denotes a ROM which stores the permanent operation processing sequence and parameters of the CPU 201. The ROM 203 includes a program ROM which stores an Operating System (OS) as a system program that implements device control of the information processing apparatuses 101 to 103, and a data ROM which stores information and the like required to operate the system. An HDD 209 to be described later may often be used in place of the ROM 203.

Reference numeral 204 denotes a network interface (NETIF) which makes control for data transfer among the information processing apparatuses 101 to 103 via the network 105, and diagnoses their connection states.

Reference numeral 205 denotes a video RAM (VRAM) which is used to render an image to be displayed on the screen of a Cathode Ray Tube (CRT) 206, and to control a display that indicates, e.g., the operating states of the information processing apparatuses 101 to 103 (to be described later). Reference numeral 206 denotes a display device such as a CRT or the like. Reference numeral 207 denotes a controller for controlling an input signal from an external input device 208 (to be described below). Reference numeral 208 denotes an external input device that receives user's operations at the information processing apparatuses 101 to 103, and includes, e.g., a keyboard and a pointing device such as a mouse or the like that will be simply abbreviated as KB hereinafter. Reference numeral 209 denotes an HDD which is used to save an application program and various data. The application program in this embodiment means a software program that implements the functions of various processors 303 to 307 which form this embodiment.

Reference numeral 200 denotes a transmission bus (address bus, data bus, I/O bus, control bus, and the like) which is used to interconnect the aforementioned units.

The information processing apparatus of the print shop 103 further comprises a controller (PRTC) for controlling an output signal to the printer 104, and a printer as the printer (PRT) 104.

Figure 3:
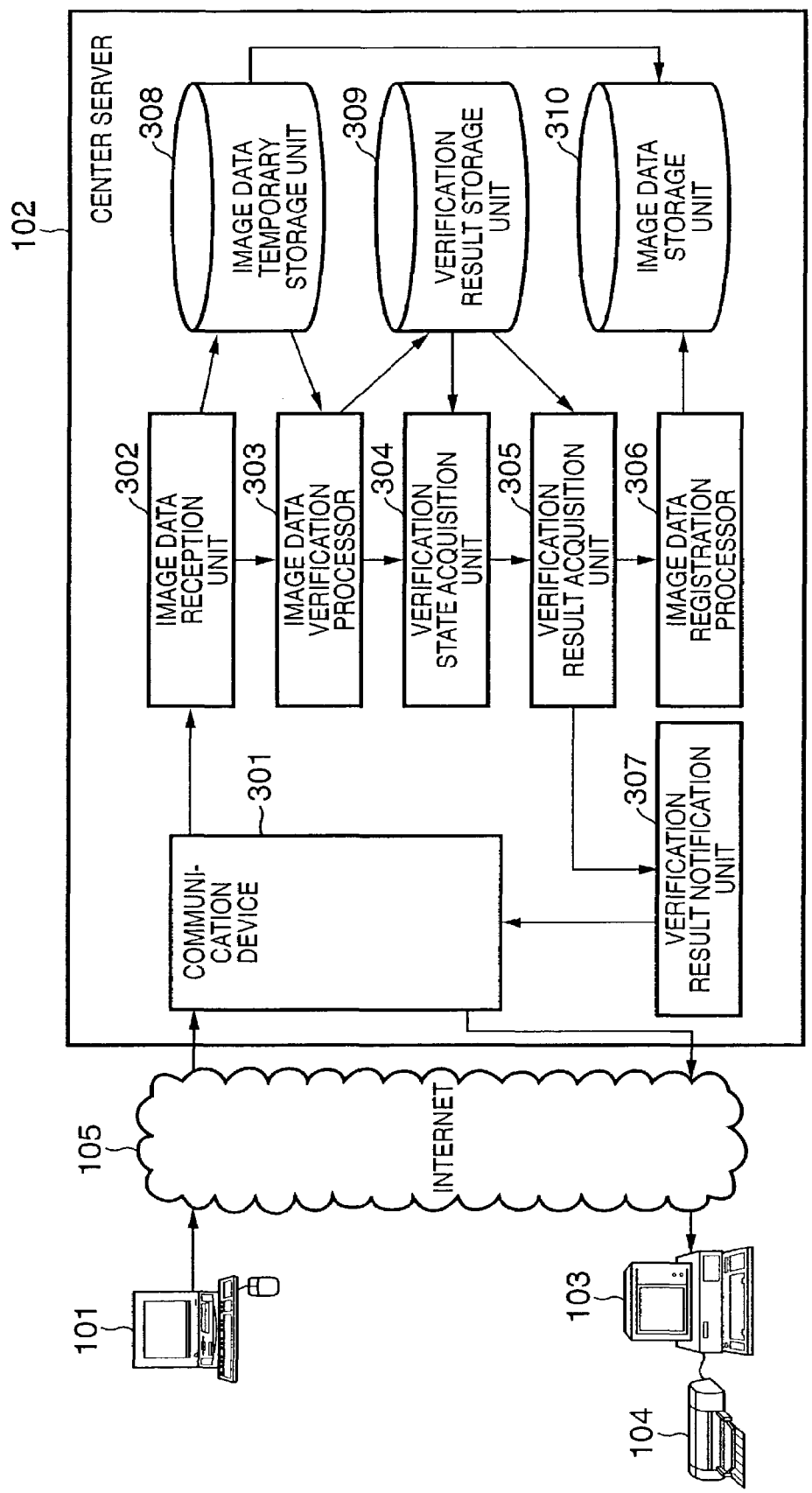
FIG. 3 is a block diagram showing functional elements in the center server required for an image data verification process in this embodiment.

Example of Processing Function Arrangement of Information Processing Apparatus of This Embodiment FIG. 3 is a block diagram for explaining processing functions which run in the center server 102 and storage units which store information, an outline of the flow of control and information among the processing functions and storage units, and an outline of the flow of control and information among the user system 101, center server 102, and print shop 103. Arrows in FIG. 3 indicate principal ones of the flow of control and information among processors and information.

Referring to FIG. 3, reference numeral 301 denotes a communication device which establishes connection to the network 105 to communicate with the user system 101 and print shop 103. In FIG. 3, reference numerals 302, 303, 304, 305, 306, and 307 denote processors that are application programs or modules implementing some functions of a program, which are loaded from the ROM 203 and HDD 209 of the information processing apparatus forming the center server 102, are mapped on the RAM 202, and are used by the CPU 201. In FIG. 3, reference numerals 308, 309, and 310 denote information storage units which store information using at least one of the HDD 209 and RAM 202 in the information processing apparatus forming the center server 102 using file systems or database systems.

The information processing apparatuses of the user system 101, center server 102, and print shop 103 exchange data via the NETIFs 204 and network 105.

User's information or instruction is input via the KB 208 or NETIF 204. The input user's information or instruction is stored in the RAM 202 as needed, and is sent to the CPU 201. The CPU 201 makes arithmetic operations using the processors 303 to 307, and stores the results in the ROM 203, RAM 202, and HDD 209. The CPU 201 stores the arithmetic operation results in the information storage units 308 to 310 on the RAM 202 or HDD 209. The CPU 201 controls to display the arithmetic operation results on the CRT 206 via the VRAM 205. Data transfer among the CPU 201, RAM 202, ROM 203, NETIF 204, VRAM 205, KBC 207, and HDD 209 is made via the transmission bus 200.

The processors and information storage units will be described in detail below.

In this embodiment, various application programs are installed in the HDD 209 in the user system 101. A case will be explained below wherein an application program that requests the print shop 103 to print image data is executed. The user inputs information and an instruction via the network IF, KB, and KBC to operate the user system 101. The user of this application program will be simply referred to as an application user hereinafter.

In this embodiment, the center server 102 is a system which executes automatic processes in accordance with information and instructions from the user system 101 and does not require any operator in a normal process.

In this embodiment, an operator of, e.g., an agent that manages print services using an application program operates the print shop 103. The operator of the print shop will be referred to as a print shop operator hereinafter.

Reference numeral 302 denotes an image data reception unit which receives image data from the application program of the user system 101(X) when the user system 101(X) requests a print process of image data via the network 105 and communication device 301. The received image data is temporarily stored in an image data temporary storage unit 308 (to be described later).

Reference numeral 303 denotes an image data verification processor which verifies whether or not the printer 104 of the print shop 103 can normally print image data received by the image data reception unit 302. This image data can be obtained with reference to the image data temporary storage unit 308.

Reference numeral 304 denotes a verification state acquisition unit for acquiring the status of an image data verification process executed by the image data verification processor 303. The status of the verification process changes depending on the operating state of the image data verification processor 303. The image data verification processor 303 writes the status in a verification result storage unit 309. The verification state acquisition unit can detect the status of the image data verification process with reference to the verification result storage unit 309.

Reference numeral 305 denotes a verification result acquisition unit which acquires a verification result when the verification state acquired by the verification state acquisition unit 304 is "verification end state". The verification result acquisition unit 305 can acquire the verification result of image data with reference to the verification result storage unit 309.

Reference numeral 306 denotes an image data registration processor which registers image data when the verification result acquired by the verification result acquisition unit 305 indicates that the image data can be normally printed by the printer 104 of the print shop 103. The image data registration processor 306 acquires image data from the image data temporary storage unit 308, and saves that image data in an image data storage unit 310.

Reference numeral 307 denotes a verification result notification unit for notifying the user system 101 of the verification result acquired by the verification result acquisition unit 305. The verification result notification unit 307 changes its notification method depending on the state of a process on the application program.

Example of Process of Center Server in Information Processing System of This Embodiment (Example of Verification Processing Sequence in Center Server)

Figure 4:
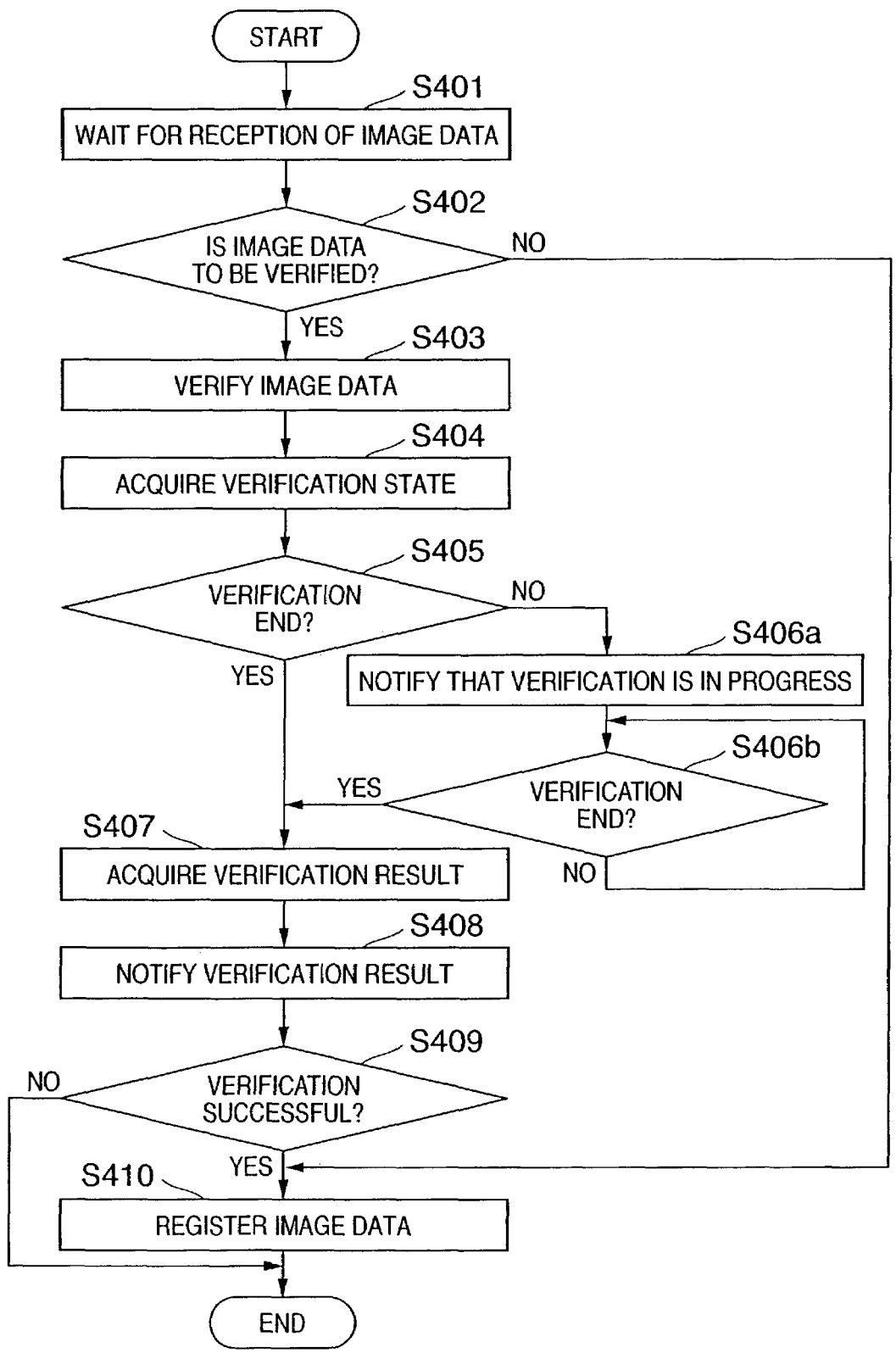
FIG. 4 is a flow chart showing the flow of an image data verification process in the center server in this embodiment.

FIG. 4 is a flow chart showing the sequence of the verification process of image data received by the center server 102 shown in FIG. 1. Assume that an image data verification program is stored in the ROM 203 or HDD 209 in the center server 102. Using this image data verification program, image data received from the user system 101 can be verified.

In step S401, the center server 102 receives image data created, edited, and selected by the user system 101 by the communication device 301. The received image data is stored in a temporary storage assured on the HDD 209 in the center server 102.

Note that image data is locally stored in the user system or is saved in a server on the network, and is selected by the user system 101.

The center server 102 determines in step S402 whether or not the image data received in step S401 is to be verified. The center server 102 determines based on an instruction received from the user system 101 whether or not the image data is to be verified. Upon receiving an instruction that instructs not to verify image data from the user system 101, the center server 102 stores the image data in its image data storage unit 310 without verifying the image data. In this case, whether or not the printer 104 can normally execute a print process is not guaranteed.

Processes in step S403 and subsequent steps are executed when the user system 101 instructs the center server 102 to verify the image data in step S402. In step S403, the image data verification processor 303 of the center server 102 verifies the image data.

In step S404, the verification state acquisition unit 304 of the center server 102 acquires the state of the verification process by the image data verification processor 303 in step S403 from the verification result storage unit 309. The state of the verification process includes, e.g., "verification in progress", "verification end", and the like.

It is checked in step S405 if the verification state acquired by the verification state acquisition unit 304 of the center server 102 in step S404 indicates "verification end".

If it is determined in step S405 that verification is in progress, the verification result notification unit 307 of the center server 102 notifies the user system 101 that the verification process of the image data is in progress, via the communication device 301 in step S406a. In step S406b, the center server 102 waits until the verification state indicates "end".

On the other hand, if it is determined in step S405 that verification is complete, the verification result acquisition unit 305 of the center server 102 acquires the verification result from the verification result storage unit 309 in step S407.

In step S408, the center server 102 notifies the user system 101 of the verification result acquired by the verification result acquisition unit 305 in step S407. Note that the notification method will be described later.

The verification result acquisition unit 305 determines in step S409 whether or not the verification result indicates that "image data is suited to a print process".

If it is determined in step S409 that the verification result indicates that "image data is not suited to a print process", the image data registration processor 306 of the center server 102 ends this process without registering the image data in the image data storage unit 310.

If it is determined in step S409 that the verification result indicates that "image data is suited to a print process", the image data registration processor 306 registers the image data in step S410.

(Example of Verification Processing Sequence in Center Server Upon Reception of Registration Instruction During Verification)

Figure 5:
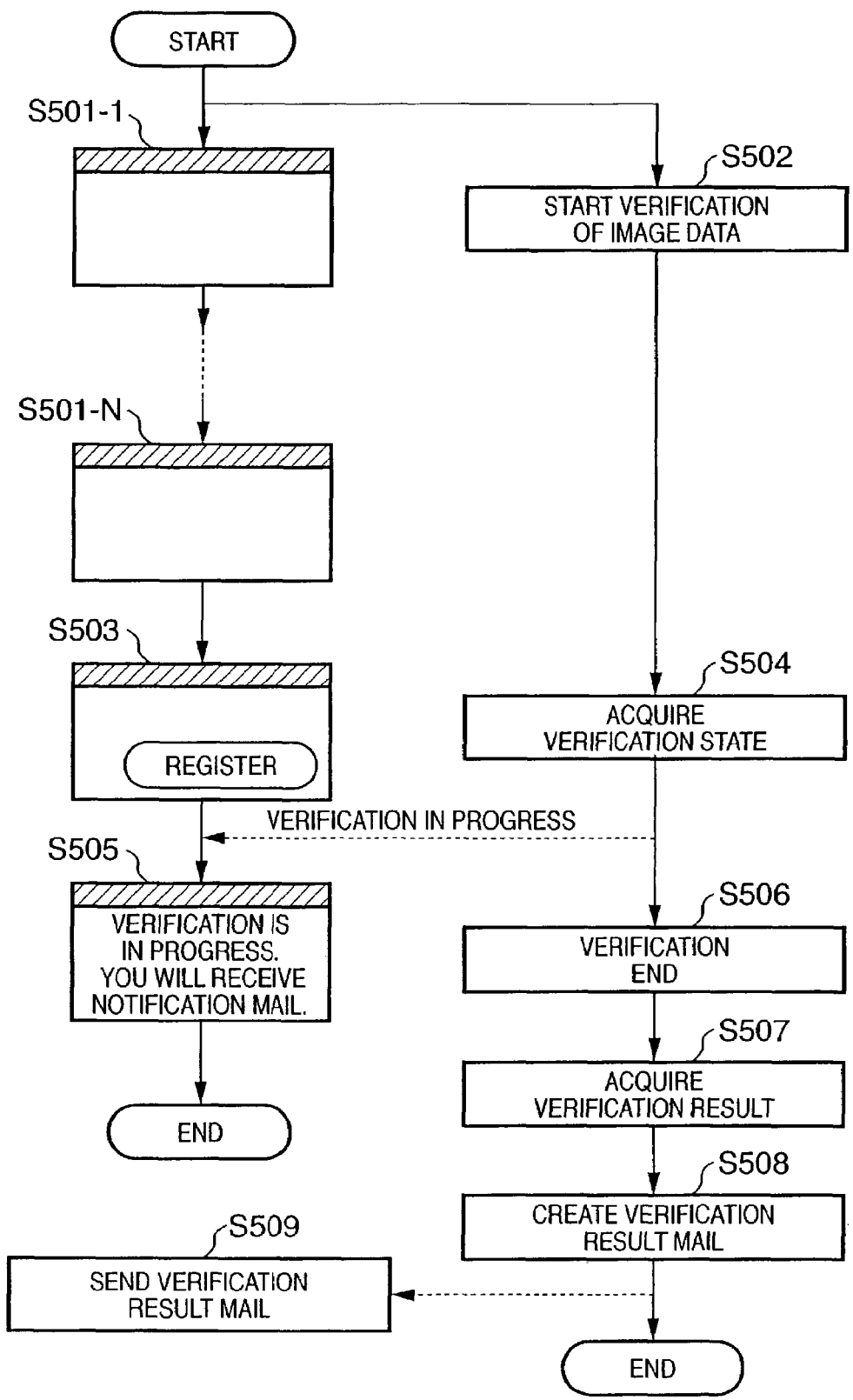
FIG. 5 is a flow chart showing the relationship between the image data verification process and the operations on a Web browser of the user system in this embodiment.

FIG. 5 is a flow chart showing the flow of a registration process and a verification process executed as a background process of the registration process, taking as an example a process executed when the user system 101 registers image data in the center server 102 using a normal Web browser, i.e., a flow chart showing the flow of the verification result notification process when the verification process of image data by the center server 102 is not complete yet upon receiving a registration instruction from the user system 101.

Since steps S501(1), . . . , S501(N) are handled as the same step in terms of their processing contents in the description of this embodiment, these steps will be simply denoted by S501.

Steps S501, S503, and S505 indicate processes executed when the user system 101 registers image data in the center server 102 using a Web browser. However, the processes of this embodiment are executed by rendering Web page data provided by the center server 102 on the Web browser of the user system 101. Hence, the processes in steps S501, S503, S505, and S509 are executed by collaboration of the user system 101 with the center server 102.

Steps S502, S504, S506, S507, and S508 indicate the flow of the image data verification process, which is executed by the center server 102 as a background process of the registration process of image data executed by the user system 101.

Step S501 is a pre-process required to register image data, which is executed according to a dialog on the Web browser displayed on the CRT 206 of the user system 101.

Step S502 is an image data verification process, which is executed by the center server 102 parallel to the image data registration process in step S501. Assume that image data is received from the user system 101 or another server that holds image data via the network 105. The image data verification process checks the resolution, size, format, and the like of image data and verifies whether or not the image data is suited to a print process of the printer 104, or whether or not the image data is suited to the size and material of an output medium.

Step S503 is a process for displaying a dialog that asks if image data is to be registered in the center server 102, on the CRT 206 of the user system 101, and receiving an instruction.

If an image data registration instruction is received in step S503, the verification state acquisition unit 304 acquires the state of the verification process executed as a background process of the center server 102 in step S504. Note that the verification process is not complete yet in this case.

Since it is determined based on the verification state acquired in step S504 that the verification process is not complete yet, a message indicating that verification of image data is in progress, and the verification result will be notified via e-mail upon completion of the verification process is displayed on an image data registration process dialog of the Web browser of the user system 101 in step S505.

Step S506 indicates that the image data verification process that was not complete yet at the time of step S504 is complete.

Step S507 is a process for acquiring the verification result of the image data, whose verification process is complete in step S506, by the verification result acquisition unit 305.

Step S508 is a process for dreating e-mail message text indicating the verification result acquired in step S507.

Step S509 is a process for sending the e-mail message indicating the verification result of the image data to the user system 101. Assume that the user system 101 has notified the center server 102 of its e-mail address in step S501.

(Example of Verification Processing Sequence in Center Server Upon Reception of Registration Instruction After Verification)

Figure 6:
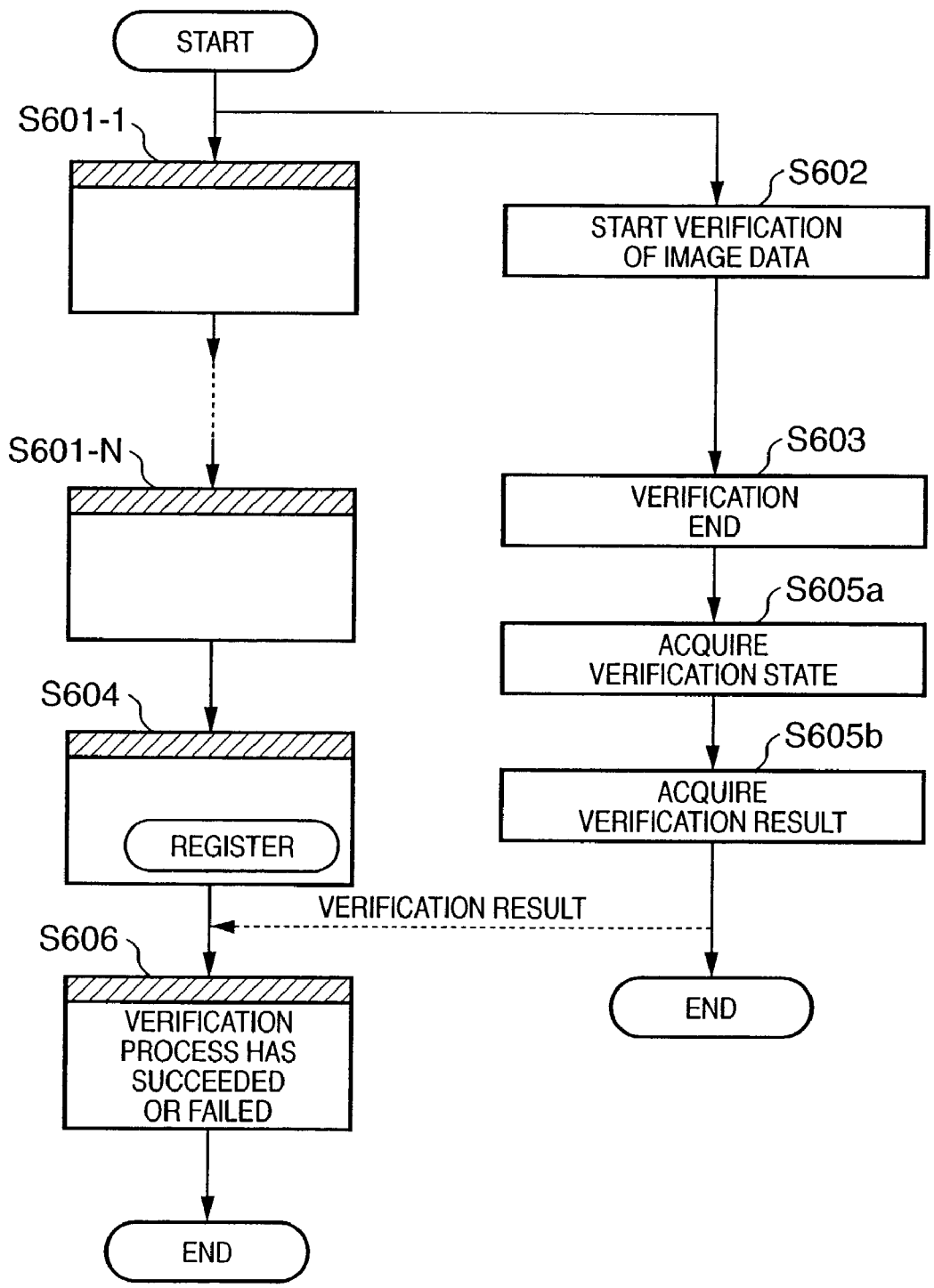
FIG. 6 is a flow chart showing the relationship between the image data verification process and the operations on the Web browser of the user system in this embodiment.

FIG. 6 is a flow chart showing the flow of a registration process and a verification process executed as a background process of the registration process, taking as an example a process executed when the user system 101 registers image data in the center server 102 using a normal Web browser, i.e., a flow chart showing the flow of the verification result notification process when the verification process by the center server 102 is complete upon receiving a registration instruction from the user system 101.

Since steps S601(1), . . . , S601(N) are handled as the same step in terms of their processing contents in the description of this embodiment, these steps will be simply denoted by S601.

Steps S601, S604, and S606 indicate processes executed when the user system 101 registers image data in the center server 102 using the Web browser. However, the processes of this embodiment are executed by rendering Web page data provided by the center server 102 on the Web browser of the user system 101. Hence, the processes in steps S601, S604, and S606 are executed by collaboration of the user system 101 and center server 102.

Steps S602, S603, S605a, and S605b indicate the flow of the image data verification process, which is executed by the center server 102 as a background process of the registration process of image data. Assume that image data is received from the user system 101 or another server that holds image data via the network 105. The image data verification process checks the resolution, size, format, and the like of image data and verifies whether or not the image data is suited to a print process of the printer 104, or whether or not the image data is suited to the size and material of an output medium.

Step S601 is a pre-process required to register image data, which is executed according to a dialog on the Web browser displayed on the CRT 206 of the user system 101.

Step S602 is an image data verification process, which is executed parallel to the image data registration process in step S601.

Step S603 indicates that the image data verification process in step S602 is complete.

Step S604 is a process for displaying a dialog that asks if image data is to be registered in the center server 102, on the CRT 206 of the user system 101, and receiving an instruction.

Step S605 is a process for acquiring the verification state by the verification state acquisition unit 304 of the center server 102. Assume that the verification state indicates "end".

Step S605b is a process for acquiring the verification result of the image data by the verification result acquisition unit 305.

In step S606, the verification result, which is acquired in step S605b while the user makes the registration process of image data in step S604, is notified on the image data registration process dialog of the Web browser of the user system 101.

(Example of Configuration of Verification Result Storage Unit)

FIG. 7 shows an example of a verification result table stored in the verification result storage unit 309.

Reference numeral 701 denotes the job ID of a verification process. This job ID is a unique ID which is assigned at the beginning of the verification process. The center server 102 manages verification processes on the basis of the job IDs. Reference numeral 702 denotes the file name of image data sent from the user system 101. Reference numeral 703 denotes a date and time at which the center server 102 started the verification process. As a use example of this data, when a predetermined period of time has elapsed from the verification process start date and time, that job can be handled as an error.

Reference numeral 704 denotes a verification state indicating the state of the verification process. The verification state includes, for example, "execution in progress", "execution end", "error", "execution standby", and the like. This verification state is acquired by the verification state acquisition unit 304. Reference numeral 705 denotes the result of the verification process. This result value includes, for example, "suited to print", "not suited to print", and the like. This verification result is acquired by the verification result acquisition unit 305.

Figure 8:
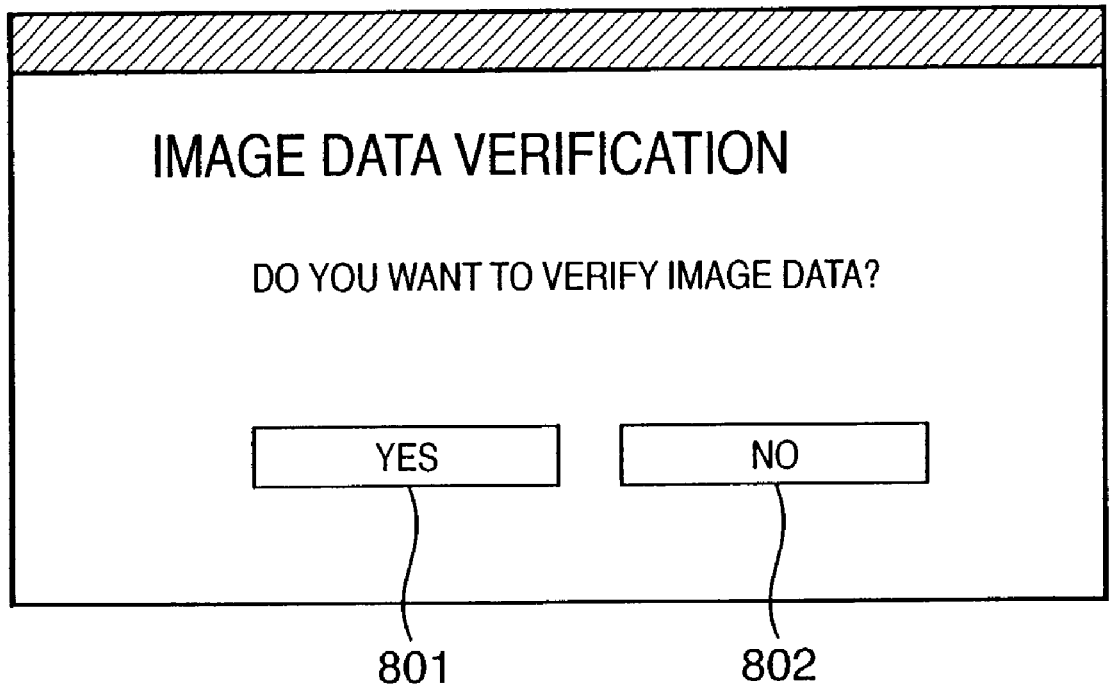
FIG. 8 shows an example of a diagram which allows the user system to make operations with respect to the center server.

FIG. 8 shows an example of a dialog which is displayed on the CRT 206 of the user system 101 to ask the application user if image data sent from the user system 101 to the center server is to be verified. FIG. 8 shows a display example on a normal Web browser. If the user has pressed a "YES" button 801, the center server 102 accepts that instruction, and starts the verification process of image data.

Figure 9:
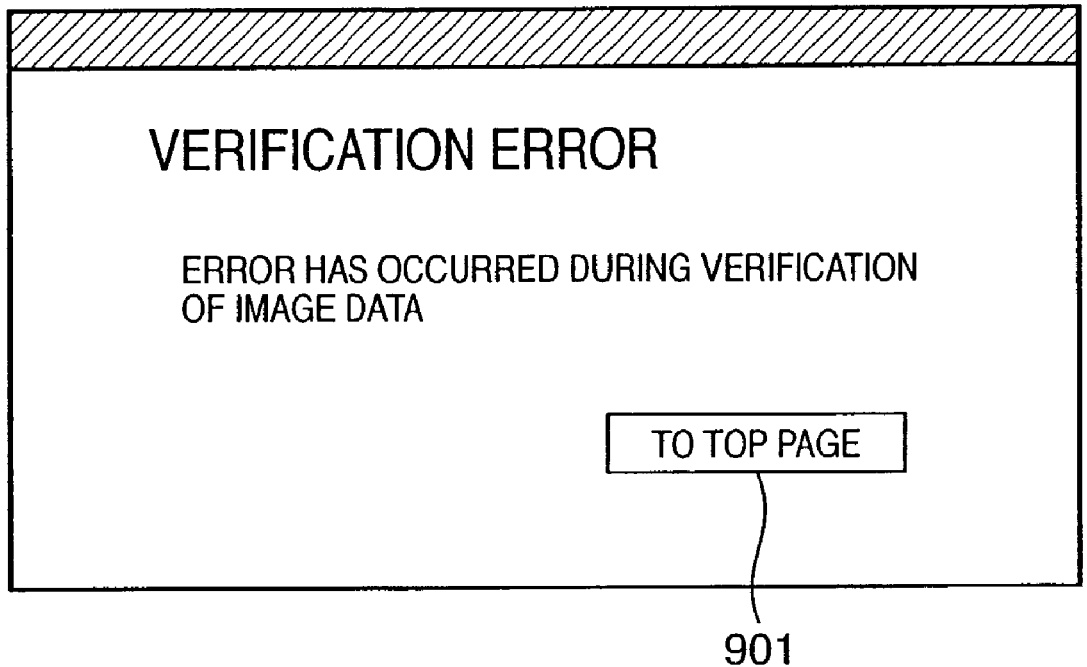
FIG. 9 shows an example of a diagram which allows the user system to make operations with respect to the center server.

FIG. 9 shows an example of a dialog which is displayed on the CRT 206 of the user system 101 when the verification process of image data is executed by the center server 102 and it has resulted in a failure. FIG. 9 shows a display example on a normal Web browser. The dialog displays a message notifying that an error has occurred during verification of image data.

Figure 10:
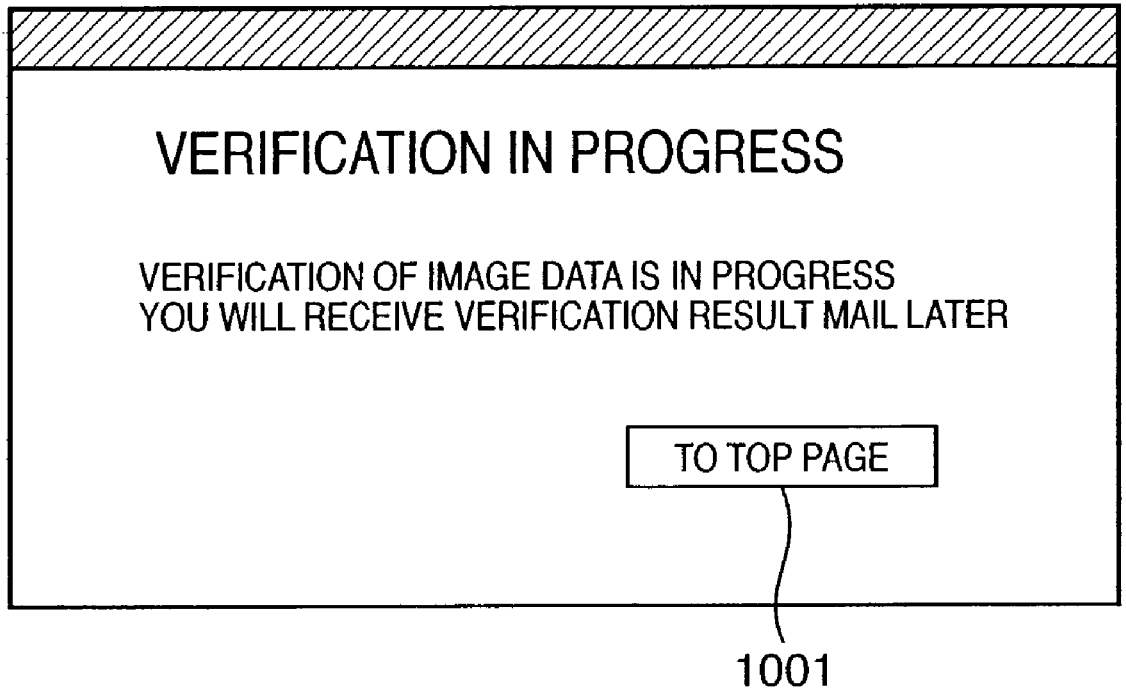
FIG. 10 shows an example of a diagram which allows the center server to contact the user system.

FIG. 10 shows an example of a dialog which is displayed on the CRT 206 of the user system 101 when the verification process of image data has been made by the center server 102, and it is not complete yet upon receiving an image data registration process instruction from the user system 101 (when a "register button" is pressed in step S503 and the center server 102 receives the registration instruction from the user system 101). This dialog displays a message notifying that verification of image data is in progress, and a verification result will be notified via e-mail later.

Note that the present invention may be applied to either a system constituted by a plurality of devices (e.g., a host computer, interface device, reader, printer, and the like), or an apparatus consisting of a single equipment.

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the aforementioned flow charts.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus communicating with communication terminals, which are respectively installed with Web browser programs, via the Internet, comprising:

first reception means for receiving image data in response to a request from a Web browser program running on one of the communication terminals;

verification means for verifying, as a background verification process, whether or not the received image data is suited to a print process based on attribute information of the received image data;

second reception means for receiving an instruction for registering the received image data using the Web browser program running on the one of the communication terminals;

acquisition means for acquiring an operating state of the background verification process by the verification means, when the second reception means has received the instruction for registering the received image data, the operating state including a state in which the background verification process has completed and a state in which the background verification process is still in progress without completion; and control means for controlling selectively to send Web page data including a verification result of the back round verification process to a Web page of the Web browser program running on the one of the communication terminals, if the operating state acquired by the acquisition means indicates that the background verification process has completed, and not to send Web page data including the verification result of the background verification process to the Web page of the Web browser program running on the one of the communication terminals, but rather to send an e-mail message including the verification result of the background verification process to the one of the communication terminals after detecting completion of the background verification process in progress, if the operating state acquired by the acquisition means indicates that the background verification process is still in progress without completion.

2. The apparatus according to claim 1, further comprising means for receiving a verification instruction indicating whether or not the received image data is to be verified from the Web browser program running on the one of the communication terminals, and wherein said verification means executes the verification process in accordance with the verification instruction.

3. An information processing method of an information processing apparatus that communicates with communication terminals, which are respectively installed with Web browser programs, via the Internet, comprising the steps of:

receiving image data in response to a request from a Web browser program running on one of the communication terminals;

verifying, as a background verification process, whether or not the received image data is suited to a print process based on attribute information of the received image data;

receiving an instruction for registering the received image data using the Web browser program running on the one of the communication terminals;

acquiring an operating state of the background verification process in the verifying step, when the instruction for registering the received image data has been received, the operating state including a state in which the background verification process has completed and a state in which the background verification process is still in progress without completion;

controlling selectively to send Web page data including a verification result of the background verification process to a Web page of the Web browser program running on the one of the communication terminals, if the operating state acquired in the acquiring step indicates that the background verification process has completed, and not to send Web page data including the verification result of the background verification process to the Web page of the Web browser program running on the one of the communication terminals, but rather to send an e-mail message including the verification result of the background verification process to the one of the communication terminals after detecting completion of the background verification process, if the operating state acquired in the acquiring step indicates that the background verification process is still in progress without completion.

4. A computer-readable storage medium on which is stored a computer-executable program for making a computer execute an information processing method of an information processing apparatus that communicates with communication terminals via the Internet, the program comprising the steps of:

receiving image data in response to a request from a Web browser program-running one of the communication terminals;

verifying, as a background verification process, whether or not the received image data is suited to a print process based on attribute information of the received image data;

receiving an instruction for registering the received image data using the Web browser program running on the one of the communication terminals;

acquiring an operating state of the background verification process in the verifying step, when the instruction for registering the received image data has been received, the operating state including a state in which the background verification process has completed and a state in which the background verification process is still in progress without completion;

controlling selectively to send Web page data including a verification result of the background verification process to a Web page of the Web browser program running on the one of the communication terminals, if the operating state acquired in the acquiring step indicates that the background verification process has completed, and not to send Web page data including the verification result of the background verification process to the Web page of the Web browser program running on the one of the communication terminals, but rather to send an e-mail message including the verification result of the background verification process to the one of the communication terminals after detecting completion of the background verification process, if the operating state acquired in the acquiring step indicates that the background verification process is still in progress without completion.

5. An information processing system, comprising:

a plurality of communication terminals, which are respectively installed with Web browser programs; and an information processing apparatus that communicates with the communication terminals, each of the communication terminals comprising:

transmission means for transmitting image data to said information processing apparatus; and registration instructing means for issuing a registration instruction for said information processing apparatus to execute registration of the data transmitted by the transmission means, and said information processing apparatus comprising:

image data receiving means for receiving the image data in response to a request transmitted by a Web browser program running on one of the communication terminals;

verification means for verifying, as a background verification process, whether or not the image data received from the one of the communication terminals is suited to a print process based on attribute information of the received image data;

registration instruction receiving means for receiving the instruction for registering the received image data using the Web browser program running on the one of the communication terminals;

acquisition means for acquiring an operating state of the background verification process by the verification means, when the registration instruction receiving means has received the instruction for registering the received image data, the operating state including a state in which the background verification process has completed and a state in which the background verification process is still in progress without completion; and control means for controlling selectively to send Web page data including a verification result of the background verification process to a Web page of the Web browser program running on the one of the communication terminals, if the operating state acquired by the acquisition means indicates that the background verification process has completed, and not to send Web page data including the verification result of the background verification process to the Web page of the Web browser program running on the one of the communication terminals, but rather to send an e-mail message including the verification result of the background verification process to the one of the communication terminals after detecting completion of the background verification process in progress, if the operating state acquired by the acquisition means indicates that the background verification process is still in progress without completion.

6. The apparatus according to claim 1, wherein the attribute information includes at least one of resolution, size and format of the received image data.

* * * * *